(12) United States Patent
Zhao et al.

(10) Patent No.: US 12,104,853 B2
(45) Date of Patent: Oct. 1, 2024

(54) HEAT EXCHANGER APPARATUS

(71) Applicant: University of Hull, Hull (GB)

(72) Inventors: Xudong Zhao, Hull (GB); Peng Xu, Hull (GB); Xiaoli Ma, Hull (GB); Kevin Fancey, Hull (GB); Junming Li, Beijing (CN)

(73) Assignee: UNIVERSITY OF HULL, Hull (GB)

( * ) Notice: Subject to any disclaimer, the term of this patent is extended or adjusted under 35 U.S.C. 154(b) by 0 days.

(21) Appl. No.: 17/888,040

(22) Filed: Aug. 15, 2022

(65) Prior Publication Data

US 2022/0390177 A1 Dec. 8, 2022

Related U.S. Application Data

(63) Continuation of application No. 16/342,144, filed as application No. PCT/EP2017/075939 on Oct. 11, 2017, now Pat. No. 11,448,464.

(30) Foreign Application Priority Data

Oct. 13, 2016 (GB) ...................................... 1617362

(51) Int. Cl.
*F28C 1/00* (2006.01)
*F28D 3/00* (2006.01)
(Continued)

(52) U.S. Cl.
CPC .................. *F28C 1/00* (2013.01); *F28D 3/00* (2013.01); *F28D 3/04* (2013.01); *F28F 3/027* (2013.01); *F28F 25/087* (2013.01); *F28C 2001/006* (2013.01); *F28F 2245/02* (2013.01); *F28F 2265/20* (2013.01)

(58) Field of Classification Search
CPC ...... F28F 3/027; F28F 25/087; F28F 2245/02; F28F 2265/20; F28C 2001/006; F28C 1/00; F28D 3/00; F28D 3/04
See application file for complete search history.

(56) References Cited

U.S. PATENT DOCUMENTS

| 2,633,007 | A |   | 3/1953 | Weaver |   |
|---|---|---|---|---|---|
| 3,274,752 | A | * | 9/1966 | Huyghe | F28F 9/22 261/153 |

(Continued)

FOREIGN PATENT DOCUMENTS

| CN | 1134745 A | 10/1996 |
|---|---|---|
| CN | 1421519 A | 6/2003 |

(Continued)

OTHER PUBLICATIONS

First Office Action cited in the corresponding Chinese app No. 201780063494.X; Apr. 24, 2020; 18 pp.
(Continued)

*Primary Examiner* — Jon T. Schermerhorn, Jr.
(74) *Attorney, Agent, or Firm* — Lempia Summerfield Katz LLC

(57) ABSTRACT

A heat exchanger apparatus includes at least one metal sheet with a corrugated surface, fabric covering at least a part of one surface of the at least one metal sheet to promote evaporation, and a wetting agent in the fabric to promote wetting of the fabric, the wetting agent also acting as an anti-microbial agent.

19 Claims, 3 Drawing Sheets

(51) Int. Cl.
  *F28D 3/04* (2006.01)
  *F28F 3/02* (2006.01)
  *F28F 25/08* (2006.01)

(56) References Cited

U.S. PATENT DOCUMENTS

| | | | |
|---|---|---|---|
| 4,758,385 A * | 7/1988 | Acker | F28F 13/185 |
| | | | 261/153 |
| 5,800,595 A | 9/1998 | Wright | |
| 6,481,222 B1 * | 11/2002 | Denniston | B60H 3/02 |
| | | | 62/271 |
| 6,581,402 B2 | 6/2003 | Maisotsenko et al. | |
| 6,656,361 B1 | 12/2003 | Herron et al. | |
| 9,468,881 B2 * | 10/2016 | Clodic | B01D 53/002 |
| 2002/0038552 A1 | 4/2002 | Maisotsenko et al. | |
| 2002/0073718 A1 | 6/2002 | Maisotsenko et al. | |
| 2002/0155281 A1 | 10/2002 | Lang et al. | |
| 2003/0014983 A1 | 1/2003 | Maisotsenko et al. | |
| 2004/0061245 A1 | 4/2004 | Maisotsenko et al. | |
| 2005/0218535 A1 * | 10/2005 | Maisotsenko | F28D 5/00 |
| | | | 261/153 |
| 2006/0097223 A1 | 5/2006 | Powers et al. | |
| 2006/0144575 A1 * | 7/2006 | Chu | F28F 21/00 |
| | | | 165/166 |
| 2007/0141936 A1 | 6/2007 | Bunyard | |
| 2009/0126898 A1 * | 5/2009 | Eplee | F28D 21/0015 |
| | | | 165/10 |
| 2010/0293995 A1 | 11/2010 | Clodic et al. | |
| 2011/0209858 A1 | 9/2011 | Konno | |
| 2013/0233005 A1 | 9/2013 | Gilbert | |
| 2019/0223328 A1 * | 7/2019 | Teekell | F28D 5/00 |

FOREIGN PATENT DOCUMENTS

| | | |
|---|---|---|
| CN | 1554009 A | 12/2004 |
| CN | 101326317 A | 12/2008 |
| CN | 104534603 A | 4/2015 |
| EP | 1052458 A2 | 11/2000 |
| EP | 1538398 A2 | 6/2005 |
| EP | 1840486 A1 | 10/2007 |
| JP | S5572797 A | 5/1980 |
| JP | 3080679 B2 | 8/2000 |
| WO | 2005019739 A1 | 3/2005 |
| WO | 2005040693 A2 | 5/2005 |
| WO | 2010020997 A1 | 2/2010 |

OTHER PUBLICATIONS

First Office Action cited in the corresponding Chinese app No. 202111061236.2; Feb. 8, 2022; 16 pp.
Second Office Action cited in the corresponding Chinese app No. 201780063494.X; Sep. 28, 2020; 17 pp.
Second Office Action cited in the corresponding Chinese app No. 202111061236.2; Aug. 10, 2022; 18 pp.
Third Office Action cited in the corresponding Chinese app No. 201780063494.X; Mar. 22, 2021; 18 pp.
Third Office Action cited in the corresponding Chinese app No. 202111061236.2; Jan. 12, 2023; 18 pp.
"Communication pursuant to Article 94(3) EPC"; office action preceding Intention to grant cited in corresponding European app. No. 17 781 496.9; Jul. 3, 2020; 4 pp.
Combined Search and Examination Report cited in the corresponding app No. GB1617362.7; Mar. 31, 2017; 7pp.
Intention to grant cited in corresponding European app. No. 17 781 496.9; Mar. 29, 2021; 5 pp.
ISR 01242018, International Search Report cited in corresponding International Application No. PCT/EP2017/075939; Jan. 24, 2018; 3 pp.
Translation of Search Report cited in Chinese patent application No. 202111061236.2; Jan. 28, 2022; 3pp.
Translation of Search Report cited in the corresponding Chinese app No. 201780063494.X; 2 pp.
Written Opinion cited in corresponding International Application No. PCT/EP2017/075939; Jan. 24, 2018; 7 pp.

* cited by examiner

HEAT EXCHANGER APPARATUS

RELATED APPLICATION DATA

This application is a continuation of co-pending U.S. patent application Ser. No. 16/342,144, filed Apr. 15, 2019, which is a U.S. national phase application based on and claiming priority benefit of international application no. PCT/EP2017/075939, filed Oct. 11, 2017, and which claimed priority to British national application no. GB 1617362.7, filed Oct. 13, 2016. The entire contents of these prior filed applications are hereby incorporated by reference herein.

TECHNICAL FIELD

The invention relates to cooling systems relying on evaporative cooling, and more particularly to a heat exchanger apparatus, a cooling system, and methods of operation thereof.

BACKGROUND

It is known to provide a dew point air conditioner comprising a flat plate heat exchanger with complex heat exchanger sheets, fans, pumps, enclosure and control devices. The known heat exchanger surface typically does not have any treatment, leading to a poor water distribution and insufficient wetting, especially in the horizontal direction, due to the effect of gravity on the water. This leads to a poor heat and mass transfer between dry and wet channel air streams of the heat exchanger. Furthermore, due to the poor water distribution and insufficient wetting, the amount of circulating water within the air conditioner leads to a substantial power consumption by the pumps of the air conditioner.

The known flat plate heat exchanger makes inefficient use of the heat exchanging space, leading to a smaller heat transfer capacity. The known heat exchanger uses air guides between the adjacent heat exchanger sheets which increases air flow resistance between the sheets, leading to a higher fan power consumption.

Problems with known arrangements include excessive power consumption, excessive water consumption, and, due to the presence of bacteria etc., fouling of the heat exchanger in addition to the increased risks to health. The known flat plate heat exchanger may also have a reduced life span due to fouling and corrosion. It is known that some wetting agents can act as an anti-microbial agent. Furthermore, the use of wetting agents for evaporative cooling is known. For example, LiCl is a known moisture absorbent and surfactant, which can also have antimicrobial properties and Poly Vinyl Alcohol (PVA) is known for its use with contact lenses and in dehumidifiers. However, known techniques for operating air cooling apparatus do not involve the addition of LiCl to PVA for use in evaporative cooling to enhance the anti-microbial properties.

US2005/0218535A1 discloses a method and apparatus for indirect evaporative air-cooling in which each plate of the apparatus is made of laminate material having one sheet of wicking material for the wet zone(s) and another sheet of a water proof plastic material for the dry zone(s). The wick layer can be made of cellulose, polyester, polypropylene or fiberglass. One embodiment uses corrugated sheets, the corrugations forming the guides for the flow of air and thus forming channels. The channels are maintained by having the corrugations of adjoining plates oriented such that they are not parallel (e.g. they are at right angles) and do not nest with the adjoining plate. The plastic layer, and the cross-flow arrangement, does not assist in optimizing heat-transfer, and the use of the preferred wick material does not optimize the maintenance of moistness.

US2013/0233005A1 discloses a method of controlling the operation of an evaporative air cooler where pads (i.e. corrugated paper media) of the cooler are intermittently wetted with an amount of water to absorb and retain during each wetting operation. Any free water within the evaporative media (pad) is allowed to flow back into a reservoir below the pad. Static pressure transducers on either side of the pads enable airflow velocity there through to be measured. The airflow is limited to a velocity so as not to entrain water in the airflow during the wetting operation, and the velocity of the airflow is increased after each intermittent wetting so as to raise the level of cooling output of the cooler between each intermittent wetting operation. The wetting sequence may take up 10%-20% of the operating time. The corrugated paper media does not assist in optimizing heat-transfer, and the disclosed wetting technique does not optimize the maintenance of moistness while reducing water or power usage.

The known materials generally used for heat exchanger sheets in dew point air cooler apparatus are non-metallic materials (e.g. Kraft paper, plastic etc.). Such non-metallic materials have poor heat conduction.

It is broadly an object of the present invention to address one or more of the above mentioned disadvantages of the previously known heat exchanger apparatus.

SUMMARY

What is required is a heat exchanger apparatus, which may reduce or minimize at least some of the above-mentioned problems.

According to a first aspect of the invention, there is provided a heat exchanger apparatus, comprising at least one metal sheet with a corrugated surface, fabric covering at least a part of one surface of the at least one metal sheet to promote evaporation, a wetting agent in the fabric to promote wetting of the fabric, and which also acts as an anti-microbial agent.

Such an apparatus provides the advantage that the corrugations can reduce flow resistance due to the lack of impeding internal supports, the fabric and wetting agent can enhance evaporation rate and the wetting agent can prevent negative effects such as fouling, corrosion & bacteria growth, and these all synergistically enhance or optimize flowrate and cooling efficiency of the heat exchanger apparatus. In addition, such irregular/corrugated heat exchanging sheets can increase heat and mass transfer area by around 35%, leading to the same percentage of increase in heat transfer rate.

Preferably, the heat exchanger apparatus has an axis of elongation, the axis of elongation, in use, being arranged vertically (i.e. substantially vertically).

Preferably, the corrugated surface comprises corrugations over a first portion of the one surface of the heat exchanger apparatus. In one embodiment, the fabric covers a second portion of the one surface, the second portion overlapping the first portion. In another embodiment, the fabric covers a second portion of the one surface, the first portion being fully contained within the second portion. Advantageously, the fabric thus covers all of the corrugations, so that the fabric enhances evaporation rate over the entire corrugated surface.

Preferably, the one surface of the heat exchanger apparatus comprises, outside the first portion, a third portion, the third portion being flat. The third portion is a portion or part of the one surface that is flat or planar. This can enhance flow efficiency in the vicinity of the third portion, i.e. near air inlets and outlets respectively. Preferably, in use, (i) the first portion is disposed on an upper portion of the heat exchanger apparatus and/or is contiguous with an air outlet, and/or (ii) the third portion is disposed on a lower portion thereof and/or is contiguous with an air inlet. In this context contiguity means that an edge of the first portion, or an edge of the third portion shares an edge or boundary with the air inlet or outlet as required.

Preferably, the one surface of the heat exchanger apparatus comprises, outside the first portion, a fourth portion, the fourth portion being flat. Preferably, in use, the fourth portion is disposed on an uppermost portion of the heat exchanger apparatus and/or is contiguous with an air outlet.

Preferably, the corrugated surface has in cross-section a profile of a periodic waveform. The waveform may be quasi sinusoidal or triangular. This configuration enables abutment of adjacent sheets at the edges (peaks) formed by the corrugations, or near to those peaks, to form effective airflow channels. This configuration beneficially omits channel supporters (or so-called 'air guides') from the heat exchanger stack, leading to around 55% reduction in air flow resistance and the same percentage of fan power saving.

Preferably, the periodic waveform has a peak-to-peak distance of (i) 10-13 mm, (ii) 11-12 mm or (iii) 11.6 mm Preferably, the periodic waveform has an amplitude of (i) 2-3 mm, (ii) 2.2-2.8 mm or (iii) 2.5 mm Preferably, corrugations intersect the plane of the heat exchanger apparatus at an angle to that plane of (i) 46-54 degrees, (ii) 48-52 degrees, or (iii) 50 degrees. Preferably, the corrugated surface has a dimension, in the direction transverse to the direction of extension of corrugations therein, of (i) 300-400 mm, (ii) 325-375 mm, or (iii) 348 mm.

Preferably, the fabric is a synthetic moisture-wicking fabric. Preferably, the fabric is formed of polyester. Preferably, the fabric is formed of textile fabric. The inventors have discovered that the use of fabric made from a material such as polyester fibre can significantly improve the wetability and water diffusivity across the surface of the fabric, thus enhancing its heat transfer performance.

Preferably, the wetting agent is a haloid and polyvinyl surfactant. Preferably the wetting agent comprises Polyvinyl Pyrollidone (PVP) or Polyvinyl-Alcohol (PVA). Preferably the wetting agent comprises a salt compound.

Preferably, the wetting agent is a LiCl/Polyvinyl-Alcohol (PVA) solution. The inventors have discovered that the use of the LiCl/Polyvinyl-Alcohol coating solution on the wet surface of the heat exchanging sheets can enhance the heat exchanger sheets' water adsorption capacity, and prevent a negative effect (e.g. fouling, corrosion & bacteria growth) on the surface. This enhances efficiency of operation and can prevent adverse health effects.

Preferably, the metal sheet is formed of aluminium. This assists in improving/maximising heat transfer from dry channels to wet channels. Preferably, a marine adhesive is used in bonding the fabric to the aluminium heat exchanger sheets, advantageously creating a strong bond and long life-span for the heat exchanging sheets.

Preferably, some or all of the corrugations in the corrugated surface have one or more through holes at or near one end thereof. This assists in separating the flow into exit air and returning/exhaust air. Preferably, in use, the through holes are disposed at or near an uppermost end of the heat exchanger apparatus. This further assists in separating the flow into exit air and returning/exhaust air, i.e. shortly before the outlet of cooled working air.

Preferably, a heat exchanger apparatus according to the written description and claims is provided, comprising a plurality of metal sheets, wherein, when two or more heat exchangers are placed together, corrugated surfaces of adjacent metal sheets define channels to promote air flow.

Preferably, a water supply system is included, the water supply system being configured for supplying water to the fabric of the heat exchanger apparatus for evaporative cooling. Preferably, a controller included that is coupled to the water supply system, the controller being configured for intermittently operating the water supply system for the application of water to the fabric to maintain the fabric in a moist condition. Preferably, the water supply system is configured to recirculate water to the heat exchanger apparatus from a water sump.

According to a second aspect of the invention, there is provided a cooling system comprising: a heat exchanger apparatus according to the written description and claims; a water supply system, configured for supplying water to the fabric of the heat exchanger apparatus for evaporative cooling; a controller, coupled to the water supply system, the controller being configured for intermittently operating the water supply system for the application of water to the fabric to maintain the fabric in a moist condition.

According to a third aspect of the invention, there is provided a cooling system comprising: a heat exchanger apparatus according to the written description and claims; a water supply system, configured for supplying water to the fabric of the heat exchanger apparatus for evaporative cooling; wherein the water supply system is configured to re-circulate water to the heat exchanger apparatus from a water sump.

According to a fourth aspect of the invention, there is provided a method of operating a cooling system, the method including: providing a heat exchanger apparatus according to the written description and claims; providing a water supply system, configured for supplying water to the fabric of the heat ex-changer apparatus for evaporative cooling; providing a controller, coupled to the water supply system; and using the controller, intermittently operating the water supply system for the application of water to the fabric to maintain the fabric in a moist condition.

An advantage of this aspect is that the intermittently running of the water circulation keeps the wet surface of the heat exchanging sheet in a saturation state while preventing formation of a water film on the surface, which would reduce the evaporation of water.

According to a fifth aspect of the invention, there is provided a method of operating a cooling system, the method including: providing a heat exchanger apparatus according to the written description and claims; providing a water supply system, configured for supplying water to the fabric of the heat exchanger apparatus for evaporative cooling; using the water supply system, recirculating water from a water sump.

An advantage of this aspect is that, while the water supply is mainly delivered by tap water, a circulation pump is only activated when the bottom tank is full; this therefore minimises the pump operational time and its power consumption.

According to an alternative characterisation of the invention there is provided a heat exchanger apparatus, comprising at least one metal sheet with a first part having a corrugated surface, second part having a flat surface, and a third part having a flat surface, the second and third parts on either side of the first part, a fabric covering at least a portion of one surface of the metal sheet to promote evaporation, a wetting/anti-microbial agent in the fabric to promote wetting of the fabric and inhibit microbial growth, wherein the fabric covers at least a portion of the first part, and one or both of the second part and the third part of the one surface.

In use, the heat exchanger apparatus is disposed with the metal sheet being vertical such that the second part is contiguous with an air outlet, and the third part is contiguous with an air inlet.

Any preferred or optional features of one aspect or characterization of the invention may be a preferred or optional feature of other aspects or characterizations of the invention.

BRIEF DESCRIPTION OF THE DRAWINGS

Other features of the invention will be apparent from the following description of preferred embodiments shown by way of example only with reference to the accompanying drawings, in which.

DETAILED DESCRIPTION

Figure 1:
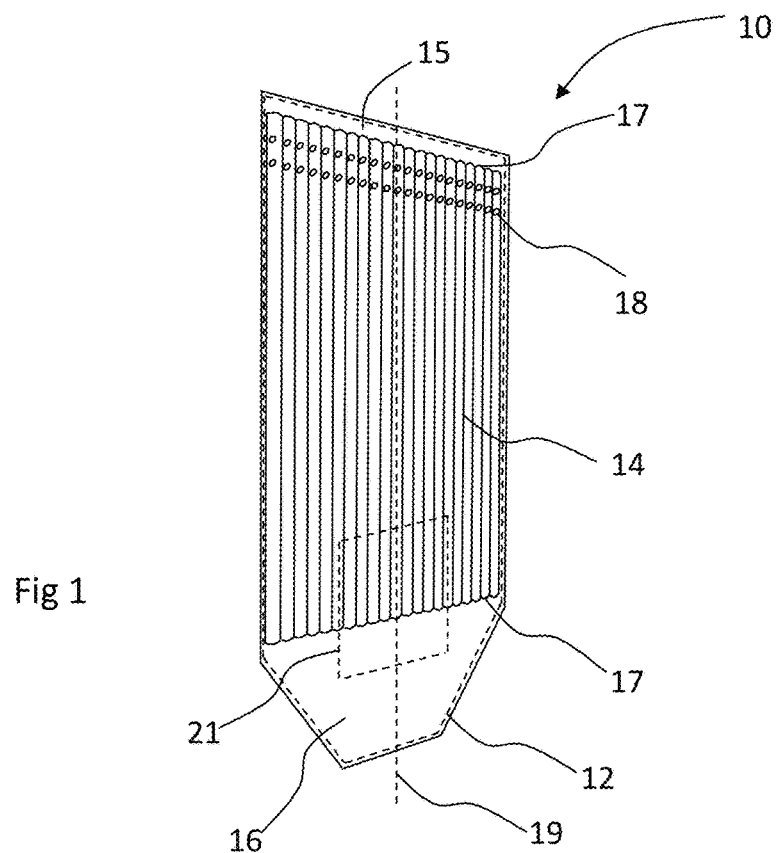
FIG. 1 shows a perspective side view of a heat exchanger sheet according to an embodiment of the invention.

FIG. 1 shows a perspective side view of a heat exchanger sheet according to an embodiment of the invention, generally designated 10. In FIG. 1 the heat exchanger sheet is shown in its normal orientation in use. The heat exchanger sheet 10 is of series 5005 aluminium. The heat exchanger sheet 10 is corrugated over an upper region 14. The series 5005 aluminium used to form the heat exchanger sheet 10 provides suitable ductility to form the corrugations, and also provides the required thermal conductivity. An upper region 15 of the heat exchanger sheet 10 is planar. A lower region 16 of the heat exchanger sheet 10 is planar. Also shown is that the transition 17 from each of the upper region 15 and the lower region 16 to the corrugations is smooth. The heat exchanger sheet 10 is 360 mm wide, and 1000 mm long. The corrugated region of the heat exchanger sheet 10 is 860 mm in length. The planer region 16 is 115 mm in length, and the planer region 15 is 20 mm in length. As shown in FIG. 1 the heat exchanger sheet 10 is elongate and an axis of elongation 19 thereof is indicated, which is a direction of the heat exchanger sheet 10 with the greatest dimension. In use the axis of elongation 19 is arranged vertically (i.e. substantially vertically). The axis of elongation 19 is also the direction in which the channels run and is also the direction in which fluid flows as discussed below.

A fabric is glued to one side of the heat exchanger sheet 10 as shown by the dashed outline 12. The fabric is preferably formed of a material exhibiting the following, or substantially similar, properties in a test of the capillary wick effect (i.e. water suction height), when the material is suspended with its lower end in water:

| | | Wicking height (cm) | | | | |
|---|---|---|---|---|---|---|
| (a) | 1.0 | 1.5 | 3.1 | 3.6 | 5.2 | 6.2 |
| (b) | 4.9 | 6.3 | 9.0 | 11.0 | 14.2 | 16.5 |

More preferably, the fabric is formed of Coolmax-2 ((b) above), available from Invista. The row (a) above is for craft paper and is included as a control to show the advantages of using Coolmax-2.

The fabric is preferably formed of a material exhibiting the following, or substantially similar, properties in a test of water diffusivity and evaporation rate, when the material is glued to the aluminium sheet, has water drops applied to it and is observed from above:

| | Drop diffusion time | | Wetted area (cm$^2$) | | Evaporation time (min) | |
|---|---|---|---|---|---|---|
| (a) | 7'30" | 9'20" | 5.6 | 57.3 | 24'10" | 46'40" |
| (b) | 57" | 11'45" | 3.4 | 64.4 | 13'12 | 29'10" |

More preferably, the fabric is formed of Coolmax-2 ((b) above), available from Invista. The row (a) above is for craft paper and is included as a control to show the advantages of using Coolmax-2. It will be appreciated that the Coolmax fabric is a polyester material, which is synthetic and generally resistant to degradation, which might be termed a synthetic moisture-wicking fabric, e.g. a woven fabric that is synthetic and moisture-wicking.

The operation to apply the fabric to the aluminium sheet involves grinding of the aluminium surface to abrade it, applying a specific Sikaflex®-291i Marine Adhesive on the rough surface, and spreading the fabric (preferably Coolmax-2 fibre) on the glued surface. It has been found by the inventors that an excellent binding up effect is thus created, leading to the enhanced heat transfer between the dry and wet sides of the sheets 10, and increased water evaporation on the wet surface of the sheets 10. Such an adhesive provides a suitable heat transfer between the aluminium heat exchanger sheet 10 and the fabric 12. In one arrangement for manufacture of the heat exchanger sheet 10, a hotplate (not shown) is preheated to a designated temperature and allowed to stabilise for about 30 minutes, the heat exchanger sheet 10 is then placed on the hotplate for about 5 minutes, the adhesive is then spread over the heat exchanger sheet 10, and then the fabric 12 is put on to the adhesive on top of the heat exchanger sheet 10. Pressure is then applied on the top of the fabric 12 (for example by placing a mass having a suitable profile onto the fabric 12), the hotplate is then allowed to cool until the adhesive is set. Such a way of applying the fabric 12 to the heat exchanger sheet 10 may be termed a hot pressure method.

To complete preparation of the fabric, a wetting agent, preferably a haloid polyvinyl surfactant solution, e.g. LiCl/Polyvinyl-Alcohol water affinity solution, is applied to the fabric. It has been found by the inventors that an enhanced water diffusivity effect is achieved and, over long-term operation, the surface had no fouling, corrosion, as well as no bacterial growth. The LiCl/Polyvinyl-Alcohol solutions act as a water affinity solution (i.e. a wetting agent), and also acts as an anti-microbial agent. Alternatively, Polyvinyl Pyrollidone (PVP) may be used instead of the Polyvinyl-Alcohol (PVA) wetting agent. Furthermore, the haloid polyvinyl surfactant solution may alternatively be termed a polymeric wetting agent, which also acts as an anti-microbial agent. In general terms the wetting agent/anti-microbial agent is a mixture of a salt and a wetting agent, for example, a combination of a lithium salt and a wetting agent.

Returning to FIG. 1, in each heat exchanger sheet 10, two rows of through holes 18 are provided at an upper end of the corrugations. In one arrangement, up to four rows of through holes 18 may be provided. The through holes 18 are in a side of each raised portion of each corrugation. As will be described in more detail below, during operation, the intake air is drawn into a heat exchanger apparatus incorporating a stack of the heat exchanger sheets 10. This part of the air travels along dry channels formed by the stack. At the end of the dry channels, the air is divided into two parts: one is delivered to the room space for space cooling while the other is diverted to the adjacent wet channels, via through holes 18.

Figure 2:
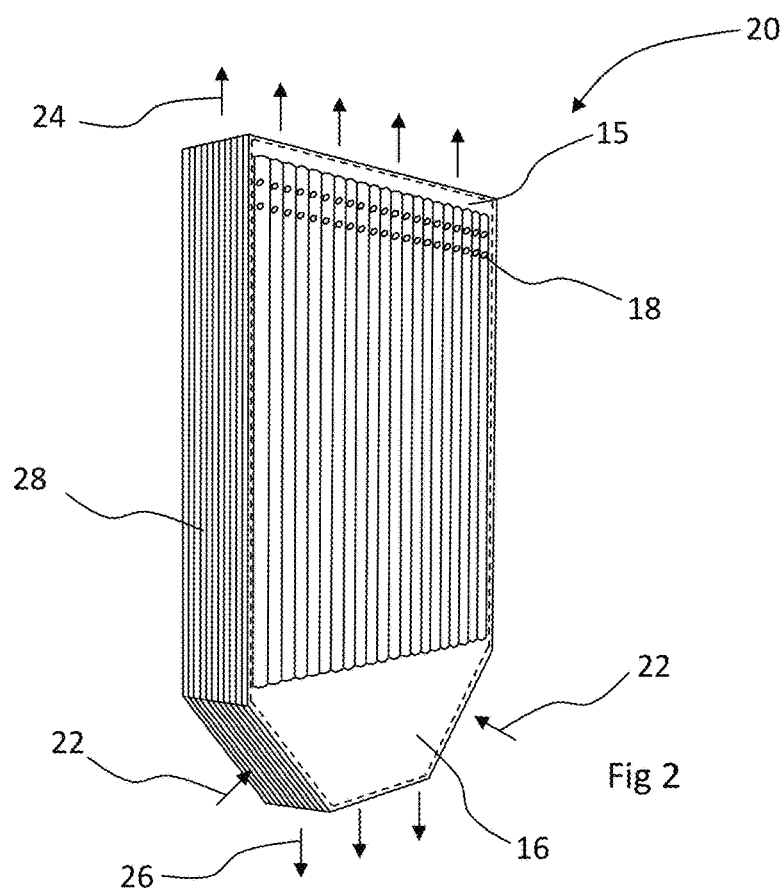
FIG. 2 shows a perspective side view of a stack of heat exchanger sheets shown in FIG. 1.

FIG. 2 shows a perspective side view of a stack of heat exchanger sheets 10 shown in FIG. 1, generally designated 20. In FIG. 2 like features to the arrangements of FIG. 1 are shown with like reference numerals. In FIG. 2 the heat exchanger sheets 10 are placed next to each other so that the aluminium sides of adjacent heat exchanger sheets 10 are facing each other, and so that the fabric sides of adjacent heat exchanger sheets 10 are facing each other. The corrugations of adjacent sheets provide vertical channels such that there are "wet channels" having fabric sides, and "dry channels" having aluminium sides. In this embodiment the gap between two heat exchanger sheets 10 to form a wet or dry channel is at its maximum 5 mm. The vertical channels comprise trapezoid or rhomboid flow channels for the "wet" and "dry" air. The surfaces of the adjacent sheets 10 do not require supporters to form these trapezoid or rhomboid flow channels, which avoids a restriction to the air flow. Such an arrangement of adjacent sheets 10 stops moisture transfer between adjacent channels and means that only heat transfer can happen between adjacent "wet" or "dry" air channels, also which provides an overall improved operation of the heat exchanger sheets 10.

In FIG. 2 the ambient intake air (either from outside of the room or mixture of outside and inside of the room air, received via an inlet air filter) is shown at 22, the cool product outlet air is shown at 24, and the working air and water discharge are shown at 26. Water is input at the top of each "wet channel". It will be appreciated that whereas the stack of heat exchanger sheets are shown at 28, in practice the sides would be closed so that air or water does not escape. In practice there might be up to 100 heat exchanger sheets 10 in a stack.

It will be appreciated that the flat regions 15 and 16 of each heat exchanger sheet 10 comprise inlet and outlet regions respectively. Such flat parts of the heat exchanger sheets 10 permit ready air and water distribution within the channels of the stack of heat exchanger sheets 20.

Figure 3:
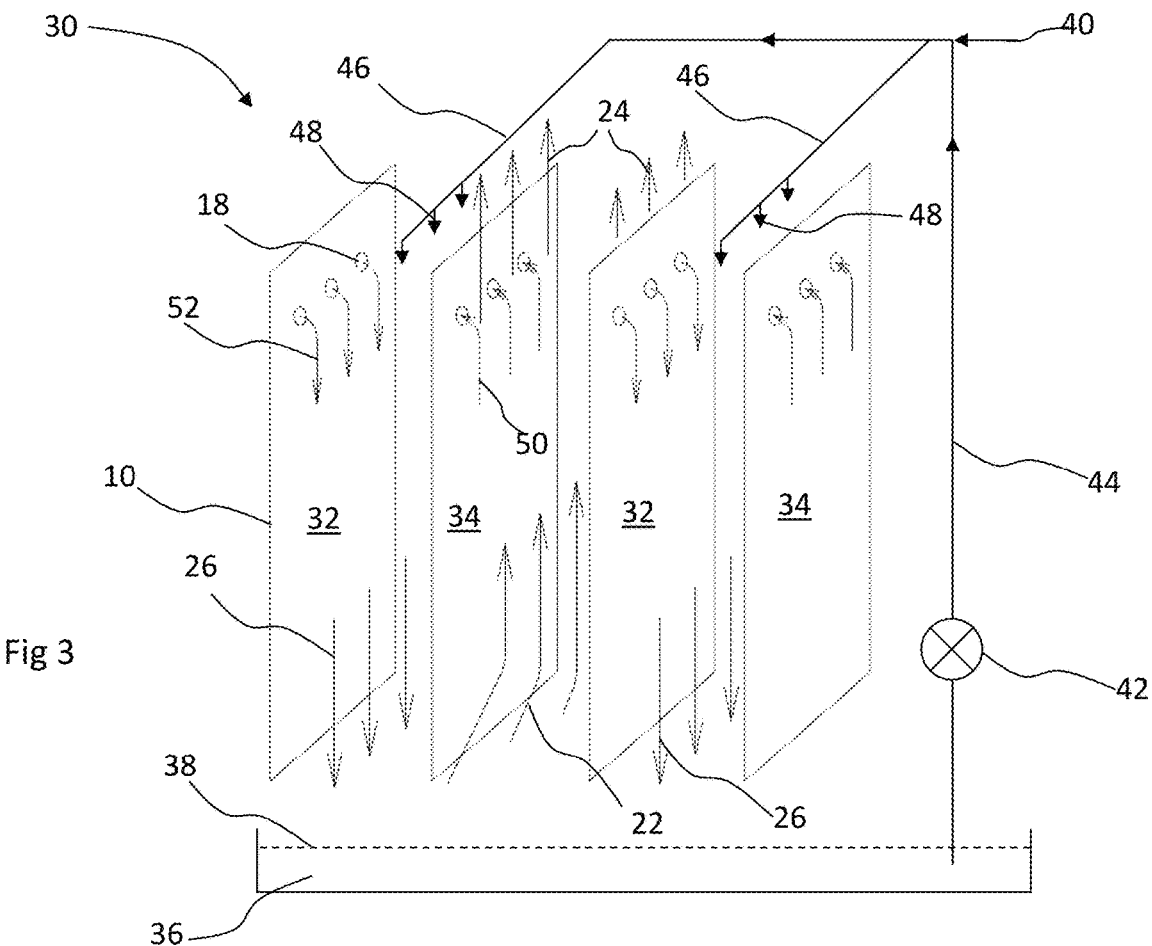
FIG. 3 is a schematic perspective view of four sheets of the apparatus of FIG. 2.

FIG. 3 is a schematic perspective view of four sheets of the apparatus 20 of FIG. 2, generally designated 30. In FIG. 3 like features to the arrangements of FIG. 2 are shown with like reference numerals. In FIG. 3 four heat exchanger sheets 10 are shown with the corrugations omitted for clarity. Surfaces of two of the heat exchanger sheets 10 having fabric on them are shown at 32 (i.e. the fabric 32 is on one side of each sheet 10). Aluminium surfaces of two of the heat exchanger sheets 10 are shown at 34 (i.e. the aluminium surface 34 is one side of each sheet 10). With such an arrangement the fabric 32 of a surface of one sheet 10 faces the fabric 32 of a surface of another sheet 10. Similarly, the aluminium surface 34 of one sheet 10 faces the aluminium surface 34 of another sheet 10. Also shown is a water reservoir 36 having a water level 38. The water reservoir is filled from a supply of water 40, which may be tap water. A pump 42 transfers water from the water reservoir 36 along conduit 44 to two water ducts 46 at the top of the two wet channels. Water 46 from the water ducts 46 wets the fabric 32 on each heat exchanger sheet 10, and the fibres of the fabric with the wetting agent help to spread moisture on the fabric 32 and enlarge the wetted area, which promotes evaporation. A valve device (not shown) may be provided so that the supply of water 30 is shut off when the reservoir water is at a certain level.

The ambient intake air 22 is drawn into a dry channel by a fan (not shown). The intake air is then split into two streams whereby one stream 50 passes into the through holes 18 and the other stream exits as the cool product outlet air 24. The stream 50 then enters the two wet channels as shown at 52 where it causes water to evaporate from the fabric. The stream 50 also absorbs the heat transported from the dry channel and receives the moisture evaporated from the wet channel surface, i.e. the fabric 32. It will be understood that the fabric 32 promotes high evaporation due to the fibres and wetting agent thereof. It will be appreciated that a top of each wet chamber is closed so that the air cannot escape from the top of each wet channel and is forced downwards as shown at 52. The working air and water discharge are shown at 26. Such an arrangement may be termed a counter flow heat exchanger whereby inlet ambient air 22 passes in one direction (i.e. upwards) on one side of a sheet 10 and working air and water 26 pass in another direction (i.e. downwards) on another side of the sheet 10. It will be understood that the inlet ambient air 22 passes upwards in a "dry channel", and the working air and water 26 pass downwards in a "wet channel". With such an arrangement each of four corrugated heat exchanger sheets 10 works as a heat transfer plate with an increased heat transfer area. The air discharged at 26 is hot and humid. It will be appreciated that the air 22 travels along the dry channels of the stack where it loses heat and becomes colder due to the established temperature difference between the dry and wet sides of the sheets 10 caused by the water evaporation on the wet surface. In effect the corrugated region provides an increased heat and mass transfer area between the air 22 and the air 26.

The four sheets 10 are only a part of the stack of heat exchanger sheets 10, and the four sheets of FIG. 3 are a small working unit of the apparatus. In practice the four-sheet unit would be repeated several times in a stack of heat exchanger sheets 10. It will also be appreciated that a controller (not shown) is coupled to the water supply system and is configured for intermittently operating the water supply system for the application of water to the fabric to maintain the fabric in a moist condition. The controller is also configured to recirculate water to the heat exchanger apparatus from the water reservoir 36, which may also be termed a water sump.

Figure 4:
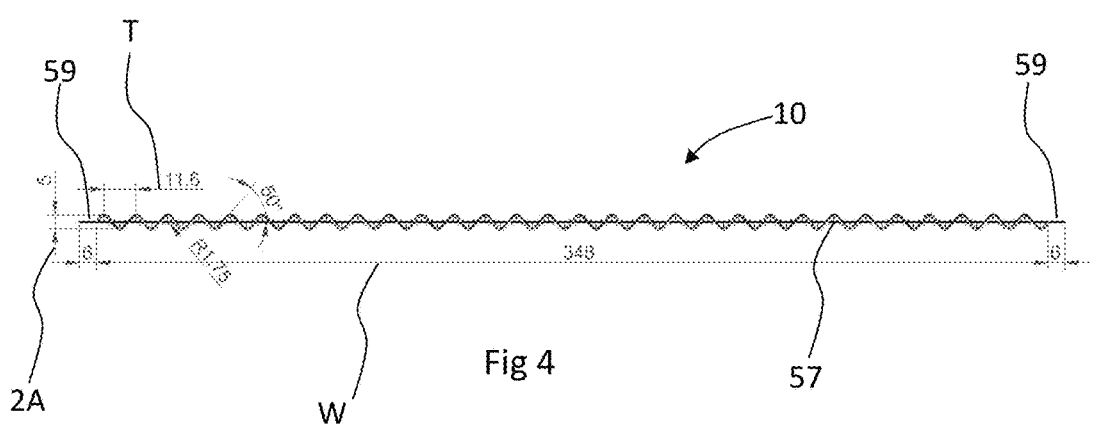
FIG. 4 is a cross section across the heat exchanger sheet shown in FIG. 1.

FIG. 4 is a cross section across the heat exchanger sheet shown in FIG. 1. As seen in FIG. 4, the corrugated surface has in cross-section a profile of a periodic waveform. Such a waveform may be quasi sinusoidal, triangular or other. An irregular or regular corrugated surface may be used.

The corrugated surface has a horizontal dimension W, in the direction transverse to the direction of extension of corrugations therein, of 300-400 mm, 325-375 mm, or, in a preferred embodiment, 348 mm. In any event, the heat exchanger sheets 10 may have side strips 59, i.e. at the edges of the sheet 10, that are 6 mm wide, thereby facilitating mounting/fixing of the sheets in a stack.

The corrugations are chosen to be of a particular dimension to promote air flow. Thus, in terms of the aforementioned periodic waveform, it may have a peak-to-peak distance T (i.e. wavelength) of 10-13 mm, 11-12 mm, or in a preferred embodiment 11.6 mm. In addition, the periodic waveform may have an amplitude 2A of 4-6 mm, 4.5-5.5 mm or, in a preferred embodiment, 5 mm Thus, in this embodiment the corrugations are 2.5 mm deep and 5.8 mm wide from the plane of the sheet 10. It has been found by the inventors that corrugations of these dimensions produce channels that are particularly effective in enhancing heat exchanger efficiency. FIG. 4 also shows that the corrugations intersect the plane of the heat exchanger apparatus at an angle to that plane of 50 degrees, and the angle may be between 46-54 degrees, or in a preferred embodiment 48-52 degrees.

It will be understood from FIG. 4 that the plane of the heat exchanger sheet 10 is shown at 57, and that the flat regions 15, 16 are coplanar with the plane 57. Such an arrangement facilitates the water distributor and the inlet/outlet of the air flow through the stack of heat exchanger sheets 10.

Figure 5:
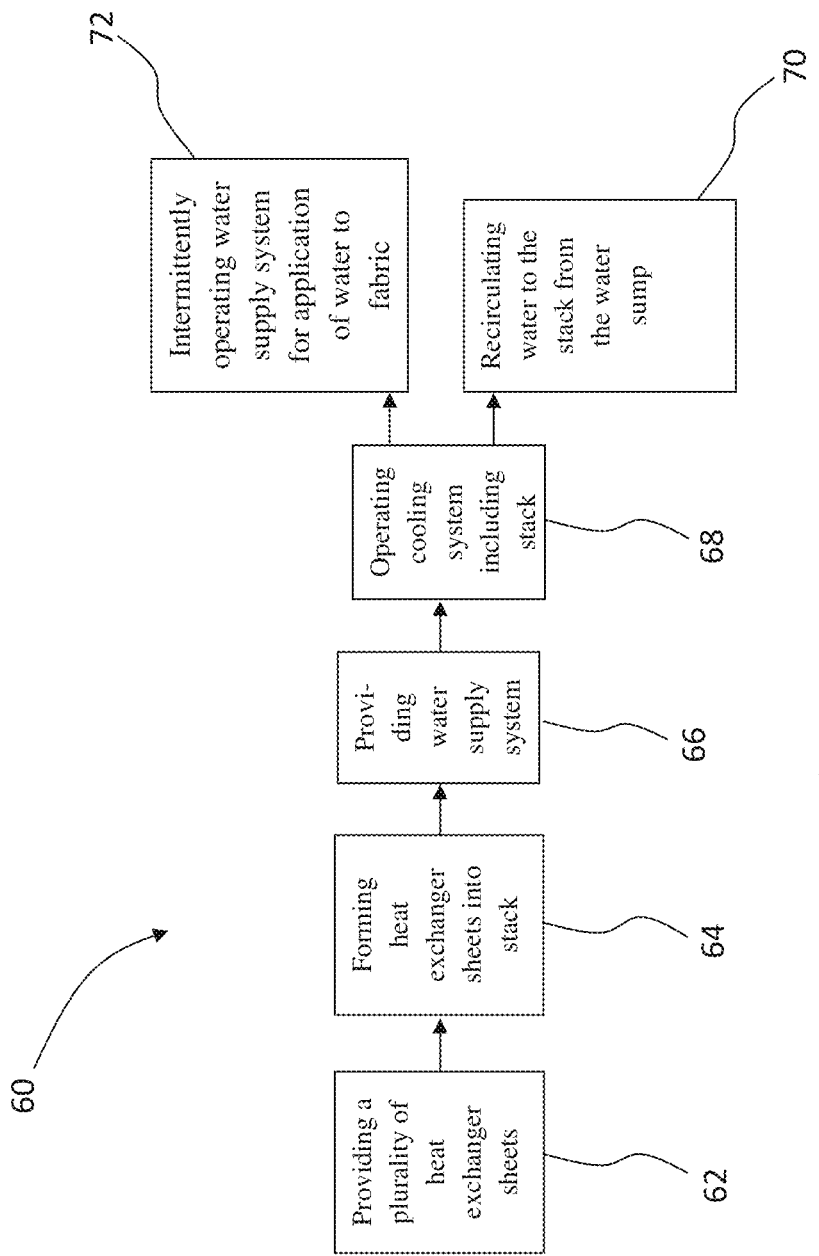
FIG. 5 shows steps of a method according to an embodiment of the invention.

FIG. 5 shows steps of a method according to an embodiment of the invention, generally designated 60. It will be appreciated that the steps may be performed in a different order and may not necessarily be performed in the order shown in FIG. 5.

Initially, at step 62, a plurality of heat exchanger sheets 10 are provided; this may involve tens or hundreds of heat exchanger sheets 10. Then, the heat exchanger sheets 10 are formed into a stack or heat exchanger apparatus at step 64. As part of a cooling system as hereinbefore described, a water supply system (including sump, conduits etc.) is provided, at step 66. Thereafter, the cooling system is operated at 68.

As part of the latter step, the method 60 may comprise the step 70 and/or the step 72. Step 70 comprises receiving water from the stack into the water sump and recirculating water back to the stack from the water sump. It has been found by the inventors that with this small amount of water supply, the water can be directly provided from a water tap, while the circulation pump need only be activated when the bottom water tank is full. This can significantly reduce the operational time of the pump and thus, minimise its power consumption.

Step 72 comprises intermittently operating the water supply system for the application of water to the fabric. It has further been found by the inventors that water supply towards the wet surfaces of the heat exchanging sheets 10 should not be run continuously; instead, it should be run intermittently, for example for 20 seconds during each ten minutes of operation. This method can create a saturated wet surface over the operational period, while preventing the formation of a water film above the wet surface, which can cause a negative effect upon the water evaporation.

Combination of the above features has led to an increase in the cooling system's energy efficiency (COP) by around 80 to 100%, which means that the new heat exchanger apparatus can achieve around 40 to 50% savings in energy use compared to the existing best performance dew point (evaporative) cooling technology with the same amount of cooling output. This will contribute to global energy savings and carbon reduction targets.

The above description describes the heat exchanger sheet 10 being corrugated over an upper region 14 thereof, the lower portion 16 being substantially flat and the portion 15 above the upper region 14 also being substantially flat. In an alternative arrangement the heat exchanger sheet 10 may be corrugated over substantially the entire surface thereof. It will be understood that the area of the corrugated region 14 relative to the area of the heat exchanger sheet 10, or the area of the flat regions 15, 16 may depend on the configuration of the heat exchanger apparatus, and the skilled person will know the requirements for determining the area of the corrugated region 14 and/or flat regions 15, 16.

In the foregoing description various portions of the heat exchanger sheet 10 are shown, for example, the portion 14 with corrugations, the portion 12 with fabric, the lower portion 16 that is flat, and the upper portion 15 that is flat. It will be understood that the area of the portions 12, 14, 15, 16 relative to one another and/or to relative to the area of the heat exchanger sheet 10 may depend on the configuration of the heat exchanger apparatus, and the skilled person will know the requirements for determining the area of the portions 12, 14, 15, 16. In one arrangement the corrugated surface comprises corrugations over a first portion 14 of the one surface of the heat exchanger sheet 10, and the fabric covers at least a second portion 21 (see FIG. 1) of the one surface, such that the second portion 21 at least overlaps the first portion 14. It will be appreciated that the second portion 21 shown in FIG. 2 is for illustrative purposes only, and the amount of overlap between the first portion 14 and the second portion 21 may be larger than shown. In another arrangement the corrugated surface comprises corrugations over a first portion 14 of the one surface of the heat exchanger sheet 10, and the fabric covers at least a second portion 12 of the one surface, the first portion 14 being fully contained within the second portion 12 (see FIG. 1).

What is claimed is:

1. A heat exchanger apparatus comprising:
   at least one metal sheet with a corrugated surface;
   fabric covering at least a part of one surface of the at least one metal sheet to promote evaporation; and
   a wetting agent in the fabric to promote wetting of the fabric, the wetting agent also acting as an anti-microbial agent.

2. A heat exchanger apparatus according to claim 1, wherein the corrugated surface includes corrugations over a first portion of the one surface of the heat exchanger apparatus.

3. A heat exchanger apparatus according to claim 2, wherein
   (i) the fabric covers a second portion of the one surface, the second portion overlapping the first portion, or
   (ii) the fabric covers a second portion of the one surface, the first portion being fully contained within the second portion.

4. A heat exchanger apparatus according to claim 3, wherein the one surface of the heat exchanger apparatus includes, outside the first portion, a third portion, the third portion being flat, wherein the heat exchanger apparatus has an axis of elongation, the axis of elongation, being arranged vertically in use of the heat exchanger apparatus, and wherein, in use of the heat exchanger,
   (i) the first portion is disposed on an upper portion of the heat exchanger apparatus and/or is contiguous with an air outlet, and/or
   (ii) the third portion is disposed on a lower portion of the heat exchanger apparatus and/or is contiguous with an air inlet.

5. A heat exchanger apparatus according to claim 4, wherein the one surface of the heat exchanger apparatus includes, outside the first portion, a fourth portion, the fourth portion being flat, and wherein, in use of the heat exchanger apparatus, the fourth portion is disposed on an uppermost portion of the heat exchanger apparatus and/or is contiguous with an air outlet.

6. A heat exchanger apparatus according to claim 2, wherein some or all of the corrugations in the corrugated surface have one or more through holes at or near one end thereof, and wherein, in use of the heat exchanger apparatus, the through holes are disposed at or near an uppermost end of the heat exchanger apparatus.

7. A heat exchanger apparatus according to claim 1, wherein the corrugated surface has, in cross-section, a profile of a periodic waveform, and
wherein the periodic waveform has a peak-to-peak distance of (i) 10 to 13 mm, (ii) 11 to 12 mm or (iii) 11.6 mm, and/or
wherein the periodic waveform has an amplitude of (i) 2 to 3 mm, (ii) 2.2 to 2.8 mm or (iii) 2.5 mm, and/or
wherein corrugations intersect a plane of the heat exchanger apparatus at an angle to the plane of (i) 46 to 54 degrees, (ii) 48 to 52 degrees, or (iii) 50 degrees.

8. A heat exchanger apparatus according to claim 1, wherein the fabric is a synthetic moisture-wicking fabric, and/or wherein the fabric is formed of (i) a polyester or (ii) a textile fabric.

9. A heat exchanger apparatus according to claim 1, wherein the wetting agent comprises a haloid and a polyvinyl surfactant.

10. A heat exchanger apparatus according to claim 9, wherein the wetting agent comprises polyvinyl pyrollidone (PVP) or polyvinyl-alcohol (PVA).

11. A heat exchanger apparatus according to claim 9, wherein the wetting agent comprises a salt compound.

12. A heat exchanger apparatus according to claim 11, wherein the wetting agent is a lithium chloride (LiCl)/polyvinyl-alcohol (PVA) solution.

13. A heat exchanger apparatus according to claim 1, wherein the at least one metal sheet comprises a plurality of the metal sheets, and wherein two or more of the plurality of metal sheets are placed together such that the corrugated surfaces of adjacent metal sheets define channels to promote air flow.

14. A heat exchanger apparatus according to claim 1, further comprising:
a water supply system, the water supply system
(i) configured to supply water to the fabric of the heat exchanger apparatus for evaporative cooling, and including a controller coupled to the water supply system, the controller configured to intermittently operate the water supply system to apply water to the fabric to maintain the fabric in a moist condition while preventing formation of a water film, or
(ii) configured to supply water to the fabric of the heat exchanger apparatus for evaporative cooling, wherein the water supply system is configured to recirculate water to the heat exchanger apparatus from a water sump.

15. A heat exchanger apparatus according to claim 1, wherein the heat exchanger apparatus has an axis of elongation, the axis of elongation being arranged vertically in use of the heat exchanger apparatus.

16. A heat exchanger apparatus according to claim 1, wherein the at least one metal sheet is formed of aluminum.

17. A method for operating a cooling system, the method comprising:
providing a heat exchanger apparatus, the heat exchanger apparatus including at least one metal sheet with a corrugated surface, fabric covering at least a part of one surface of the at least one metal sheet to promote evaporation, and a wetting agent in the fabric to promote wetting of the fabric, the wetting agent also acting as an anti-microbial agent;
providing a water supply system configured to supply water to the fabric of the heat exchanger apparatus for evaporative cooling; and
(i) providing a controller coupled to the water supply system, the controller configured to intermittently operate the water supply system to apply water to the fabric to maintain the fabric in a moist condition while preventing formation of a water film; or
(ii) recirculating water from a water sump using the water supply system.

18. A heat exchanger apparatus comprising:
a plurality of metal sheets, each metal sheet of the plurality of metal sheets having a corrugated surface with corrugations, the corrugated surfaces of adjacent metal sheets of the plurality of metal sheets defining airflow channels to promote air flow;
fabric covering at least a part of one surface of each metal sheet to promote evaporation; and
a wetting agent in the fabric to promote wetting of the fabric, the wetting agent also acting as an anti-microbial agent,
wherein the airflow channels are defined between the adjacent metal sheets by abutment of the adjacent metal sheets substantially at peaks formed by the corrugations, and
wherein, among the adjacent metal sheets, the fabric of a surface of one metal sheet faces the fabric of a surface of an adjacent metal sheet, and the metal surface of one metal sheet faces the metal surface of an adjacent metal sheet.

19. A method for operating a heat exchanger apparatus, the method comprising:
providing a heat exchanger apparatus having (i) a plurality of metal sheets, each with a corrugated surface having corrugations, (ii) airflow channels defined between and by abutment of adjacent metal sheets of the plurality of metal sheets substantially at peaks formed by the corrugations to promote air flow, (iii) fabric covering at least a part of one surface of each of the plurality of metal sheets to promote evaporation such that the fabric of a surface of one metal sheet faces the fabric of a surface of an adjacent metal sheet and the metal surface of one metal sheet faces the metal surface of an adjacent metal sheet, and (iv) a wetting agent in the fabric to promote wetting of the fabric, the wetting agent also acting as an anti-microbial agent, the method comprising:
providing a water supply system configured to supply water to the fabric of the heat exchanger apparatus for evaporative cooling; and
(i) providing a controller coupled to the water supply system, the controller configured to intermittently operate the water supply system to apply water to the fabric to maintain the fabric in a moist condition while preventing formation of a water film; or
(ii) recirculating water from a water sump using the water supply system.

* * * * *